United States Patent [19]

Saunders

[11] Patent Number: 4,658,951
[45] Date of Patent: Apr. 21, 1987

[54] RECIPROCATING TRANSFER CONVEYOR WITH SENSING ACCUMULATING PADS

[76] Inventor: Stanley S. Saunders, 315 Old Ivy, Atlanta, Ga. 30343

[21] Appl. No.: 705,973

[22] Filed: Feb. 27, 1985

[51] Int. Cl.⁴ ............................................. B65G 25/00
[52] U.S. Cl. .................................... 198/718; 198/751
[58] Field of Search .............. 198/718, 716, 744, 751, 198/743, 460, 774; 104/162, 172 B

[56] References Cited

U.S. PATENT DOCUMENTS

| | | | |
|---|---|---|---|
| 3,197,023 | 7/1965 | Achammer | 104/162 |
| 3,322,259 | 5/1967 | Milazzo | 198/718 |
| 4,357,128 | 11/1982 | Gooden et al. | 198/751 |

FOREIGN PATENT DOCUMENTS

2069437  8/1981  United Kingdom .............. 198/718

Primary Examiner—Joseph E. Valenza
Assistant Examiner—Kyle E. Shane
Attorney, Agent, or Firm—Jones & Askew

[57] ABSTRACT

An accumulating transfer conveyor utilizing a reciprocal drive and comprising a conveyor frame for supporting an article and a plurality of reciprocating sensing accumulating pads or hooks associated therewith. Each sensing accumulating pad or sensing accumulating hook senses the leading edge of an article or an article support member and means for transferring the article or the article support member forward. The sensing accumulating pads and hooks further sense the trailing edge of a preceding article or article support member so as to prevent against any contact between two articles or article support members.

16 Claims, 11 Drawing Figures

RECIPROCATING TRANSFER CONVEYOR WITH SENSING ACCUMULATING PADS

TECHNICAL FIELD

The present invention relates generally to the transfer of articles by a conveyor and, more particularly, relates to a reciprocating conveyor with sensing accumulating pads.

BACKGROUND OF THE INVENTION

Conveyors have long been recognized as extremely useful devices for transferring a wide variety of objects from one place to another. As a result, many different types of conveyors have been provided. For example, belt and screw conveyors have been provided for transferring raw materials such as mineral ore, coal or grain. Chain conveyors have been provided for transferring automobile components or other component parts in assembly lines. Pneumatic conveyors have been provided for transferring bulk materials such as granulated or pulverized chemicals.

Each of these and other prior art conveyors conventionally provide a fixed loading station, a fixed transfer section and a fixed discharge station. As a result, the object to be transferred by the conveyor must first be delivered to the loading station where it is placed onto the conveyor. After traversing the length of the transfer portion, the object arrives at the discharge station where it must be removed from the conveyor.

Operation of a conveyor is, preferably, constant. Thus, so long as objects are placed upon the loading station, they will be delivered to the discharge station at a constant rate. In order to insure smooth operation of the entire or that portion of the conveyor, objects must be removed from the discharge station at least as quickly as they are loaded onto the conveyor. Otherwise, the discharge station will overflow, causing the conveyor to jam and possibly causing objects to fall from the discharge station.

In an effort to solve the jamming problem, accumulating conveyors were developed. An accumulating conveyor senses that the discharge station (or an intermediate position) is full and must be cleared. In response to this sensed condition, operation of the conveyor ceases until the discharge station (or the intermediate position) is cleared. These accumulating transfer conveyors were provided with reciprocating drive mechanisms that advanced an object along the length of the conveyor.

One such accumulating conveyor is shown by U.S. Pat. No. 3,322,259, issued to C. J. Milazzo. The Milazzo conveyor provides a reciprocating carriage that moves lengthwise of a frame. The frame is divided into two longitudinal sections, with the carriage reciprocating therebetween. An article sensor is provided at various positions on the carriage for sensing the presence or absence of an article on the frame. In a manner common to that of many other prior art accumulating conveyors, a first embodiment disclosed by Milazzo provides a pusher member that, in response to the detection of an article by the article sensor, engages the backside of an article and pushes it along the frame. A second embodiment disclosed by Milazzo provides a plurality of independent lifting plates that, in response to an electronic sensing mechanism, rise to lift and carry articles along the frame from one position to another.

Yet other conveyors have been provided that are similar in operating concept. For example, U.S. Pat. No. 3,385,418 discloses an accumulating transfer conveyor having a pair of parallel transfer bars mounted for reciprocal movement. A detector plate is provided for sensing an article on the conveyor. In response to the detector plate, a plurality of longitudinally aligned, pivotally mounted pushers are provided to engage the trailing edge of the article and move it along the conveyor. Additionally, a set of control pushers are provided to insure that no additional articles are moved unless a particular station has been cleared. Other conveyors employing a sensing device and pushers or the like are shown by U.S. Pat. Nos. 3,527,338; 3,794,158; and 4,314,630.

These and the many other like conveyors in the art suffer from one or more of a number of disadvantages. A principal disadvantage is that such prior art conveyors primarily sense and transfer an object by its backside or its trailing edge. This arrangement mandates that the objects transferred be limited to a certain size. For example, if an article being transferred on a conveyor according to the first embodiment of Milazzo extends beyond the position of a pusher, that pusher is rendered useless to move the article along the frame. If an article being transferred on a conveyor according to the second embodiment of Milazzo is so small as to fit within the spaces between lifting plates, the article may never be moved.

Yet another disadvantage of such conveyors is that they depend on a fixed or stationary frame to support the load. As a result, the loading station and the discharge station are also fixed, necessitating that the objects or articles to be transferred be first delivered to the loading station and then removed and taken from the discharge station. In many circumstances, this problem is so acute as to require two secondary conveyor systems to load and discharge objects from a primary conveyor system.

Yet another disadvantage with such prior art conveyors is their relative complexity, especially in the reciprocating conveyor art. The article sensing device is conventionally separate and apart from the pusher or like transferring device. These devices are, in turn, separate and apart from the frame which supports the objects to be transferred. The result is a complex system consisting of many interrelated moving and stationary parts. This complexity results in frequent breakdown of the conveyor, thereby causing production delays and increased maintenance costs.

SUMMARY OF THE INVENTION

The present invention solves the above-described problems in the prior art by providing a reciprocating transfer conveyor having a plurality of sensing accumulating pads or a plurality of sensing accumulating hooks that sense and transfer articles along the conveyor without jamming. Each sensing accumulating pad or sensing accumulating hook is operatively mounted on a reciprocating member and includes both an article sensing device and an article advancing device. In response to either the leading edge, trailing edge or the absence of an article, the advancing device is manipulated so as to move a plurality of articles along the conveyor with jamming and without any articles engaging one another.

The invention is disclosed in three preferred embodiments, each of which is generally described as follows.

The first embodiment includes a roller frame that supports the articles to be transferred and a reciprocating member that carries a plurality of sensing accumulating pads. The sensing accumulating pads detect the presence or absence of an article and transfers it accordingly. The second embodiment includes a plurality of independent article supporting members which, in tandem with the articles they support, are sensed and transferred by a plurality of reciprocating sensing accumulating pads. The third embodiment includes a plurality of mechanically sensing accumulating hooks that engage the leading edge of an article support member so as to transfer it along a roller frame.

Described more particularly, a first preferred embodiment of the present invention comprises an elongate stationary frame that supports a plurality of articles that move freely thereon, a reciprocating member disposed for longitudinal movement along the length of said frame, and a plurality of sensing accumulating pads mounted upon the reciprocating member, each such pad including an article sensing mechanism and an article advancing mechanism. When the article sensing mechanism detects the leading edge of a first article on the advancing stroke of the reciprocating member, the article advancing mechanism engages the leading portion of the first article and pulls it forward along the frame. The sensing accumulating pad will then pull the article forward so long as unimpeded by any other article. When the article sensing mechanism detects the trailing edge of a second article preceding the first article, the article advancing mechanism disengages from the first article so as to prevent further forward movement thereof. Thus, when the sensing mechanism senses the leading edge of a first article, it establishes that no interferring article is present and that that first article may move forward. When the sensing mechanism senses the trailing edge of a preceding article, it establishes that an interferring article is present and releases the succeeding first article so that it comes to rest.

A second preferred embodiment of the present invention comprises a plurality of independent mobile support members, each of which supports at least one article to be transferred, a reciprocating member disposed for movement between a loading station and a discharge station, and a plurality of sensing accumulating pads mounted upon the reciprocating member, each such pad including an article sensing mechanism and an article advancing mechanism. When the article sensing mechanism detects the leading edge of a first support member on the advancing stroke of the reciprocating member, the article advancing mechanism engages the first support member and carries it forward. When the article sensing mechanism detects the trailing edge of a second article support member preceding the first article support member, the article advancing mechanism disengages from the first article support member so as to prevent further forward movement thereof.

A third preferred embodiment of the present invention comprises an elongate stationary frame, a plurality of article support members adapted to move freely along the frame and to carry at least one article, a reciprocating member disposed for longitudinal movement along the length of said frame, and a plurality of mechanically sensing accumulating hooks mounted upon the reciprocating member, each such hook including an article sensing mechanism and a hooked article advancing mechanism. When the article sensing mechanism detects the leading edge of a first article support member on the advancing stroke of the reciprocating member, the hooked member of the article advancing mechanism engages a leading portion of the first article support member and pulls it forward along the frame. When the article sensing mechanism detects the trailing edge of a second article support member, the hooked member of the article advancing mechanism disengages from the first article support member so as to prevent any further forward movement thereof and maintain a space between the first and second article support members.

Thus, it is an object of the present invention to provide an improved accumulating type of reciprocating transfer conveyor.

It is a further object of the present invention to provide a transfer conveyor that is not limited to a fixed loading station or a fixed discharge station.

It is a further object of the present invention to provide a transfer conveyor that combines the operations of article sensing and article transferring into a single unit.

It is a further object of the present invention to provide a reciprocating transfer conveyor with a single mechanical device having an article sensor and an article transfer mechanism.

It is a further object of the present invention to provide a reciprocating, accumulating type transfer conveyor that can transport articles of varying lengths.

It is a further object of the present invention to provide a rollerless accumulating type of transfer conveyor.

It is a further object of the present invention to provide a transfer conveyor that is straightforward in construction and design so as to reduce system breakdowns.

It is a further object of the present invention to provide a transfer conveyor that insures against article mishandling by spacing accumulated articles one from the other without any contact thereof.

It is a yet further object to provide a transfer conveyor that senses and transfers an article by its leading edge or by the leading portion of an article support member by which the article is carried.

These and other objects, features and advantages will become apparent from a reading of the detailed description of the invention in view of the appended drawings and claims.

DETAILED DESCRIPTION

Figure 1:
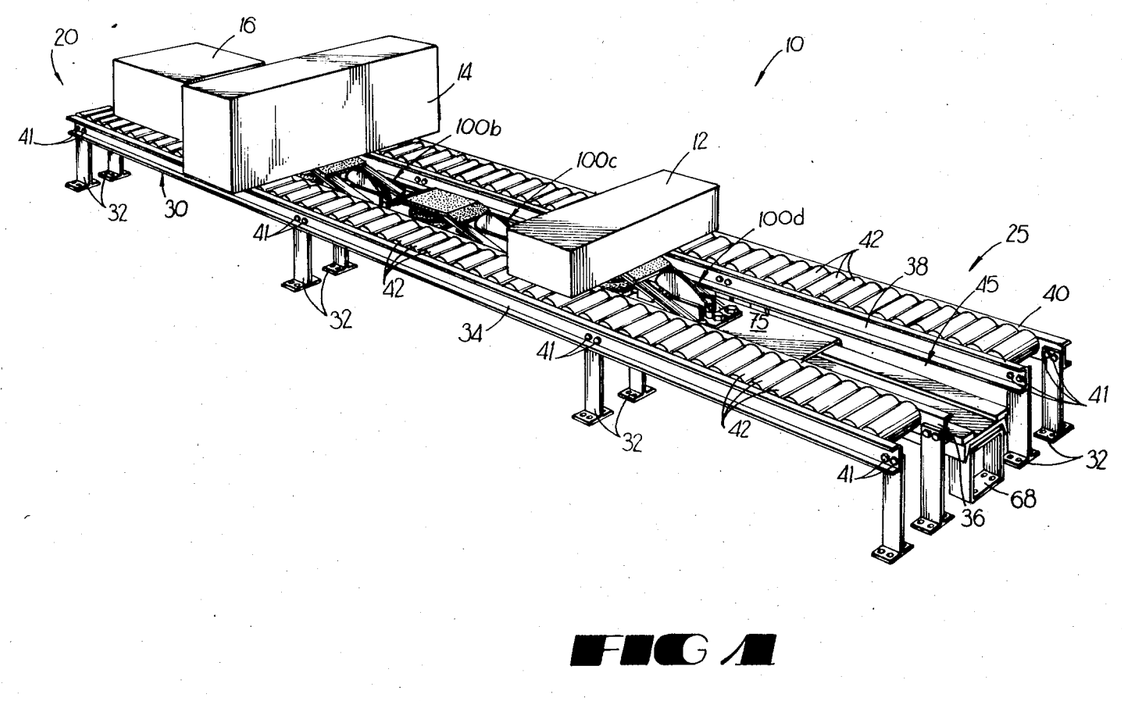
FIG. 1 is a partial pictorial view of an embodiment of a transfer conveyor according to the present invention.

Referring now in more detail to the drawings, in which like numerals indicate like parts throughout the several views, FIG. 1 shows generally at 10 a first preferred embodiment of a transfer conveyor according to the present invention. The conveyor 10 is capable of transferring differently sized articles 12, 14, 16 and 17 (FIG. 2) from a loading station 20 to a discharge station 25. Thus, as shown in the drawings, articles 12, 14, 16 and 17 travel from left to right from the loading station 20 to the discharge station 25.

The embodiment shown in FIG. 1 provides an article load and support frame, indicated generally at 30. The preferred frame 30 consists of a plurality of leg members 32 which support four elongated side members 34, 36, 38 and 40 at fixed distance above the ground surface. The side members 34, 36, 38 and 40 are U-shaped members that may be mounted upon the legs 32 by bolt assemblies 41 or other conventional fasteners. A plurality of rollers 42 are journaled between side members 34 and 36 and side members 38 and 40 in such a manner as to rotate freely about their respective axes. Thus, the articles 12, 14 and 16 are supported by the frame 30 and may be moved along the rollers 42 from the loading station to the discharge end 25 of the conveyor 10. Thus, the rollers 42 must be of sufficient diameter to extend slightly above the surface of the top flange of the elongated side members 34, 36, 38 and 40. Those skilled in the art will recognize such a mounting to be well known, and hence, it need not be disclosed further herein.

A gap 45 is defined between the innermost frame side members 36 and 38. The gap 45 runs longitudinally the length of the frame 30. As shown in FIG. 1 and described in greater detail hereinbelow, sensing accumulating pads 100 are positioned for reciprocal movement within the gap 45 so as to engage and transfer the articles 12, 14, 16 and 17 (FIG. 2) along the conveyor 10.

Figure 5:
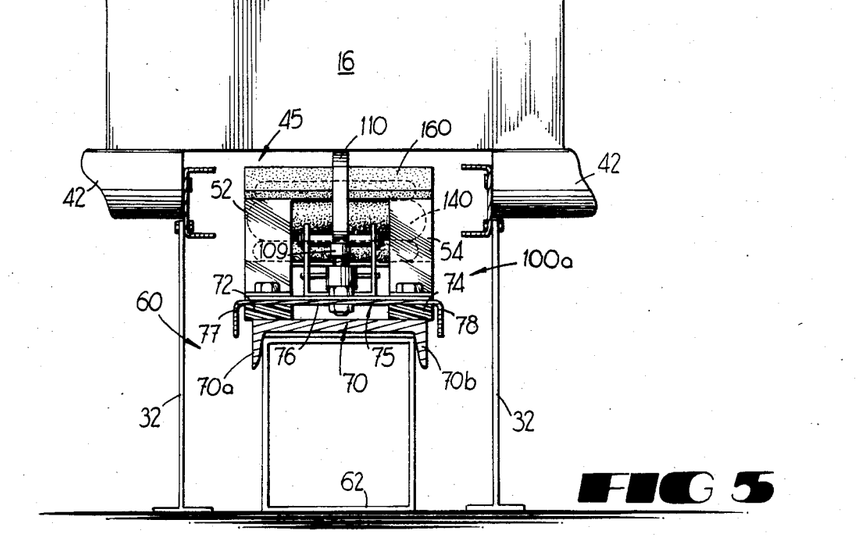
FIG. 5 is an end elevational view of the embodiment shown in FIG. 1.

A reciprocating carriage rail assembly 60 (shown in FIGS. 2 and 5) is provided in the gap 45 between the innermost frame side members 36 and 38. The reciprocating carriage rail assembly 60 provides four supporting legs 62, 64, 66 and 68. Each of these is identical in construction to the other, and hence, only one is described in detail. As shown in FIG. 5, the supporting leg 62 is rectangular in shape. The base of the leg 62 is fixedly secured to the floor by conventional fasteners (not shown).

The carriage rail assembly 60 further comprises an elongated mounting bracket 70 that extends the entire length of the assembly and is fixedly secured to the uppermost portion of the supporting legs 62, 64, 66 and 68. The mounting bracket 70 is formed having a generally inverted U-shape, the outermost flanges 70a and 70b extending downwardly over the uppermost portions of the rectangular supporting legs 62, 64, 66 and 68. The mounting bracket 70 may be secured by any suitable means. However, the mounting bracket must be secured in such a manner as to not interfere with the reciprocal movement of a carriage rail 75 as disclosed hereinbelow.

Two substantially frictionless blocks 72 and 74 are disposed on top of the mounting bracket 70. The blocks 72 and 74, which are preferably made of ultra-high molecular weight polyethylene (commonly referred to as "U.H.M.W."), are fixedly secured to the mounting bracket 70 by a bolt assembly (not shown). Of course, other means of securing the blocks 72 and 74 may be provided. The blocks 72 and 74 extend the length of the carriage rail assembly 60 and, as shown in FIG. 5, laterally project slightly outward of the mounting bracket 70. A carriage rail 75 is disposed for reciprocal sliding movement on top of the blocks 72 and 74. The carriage rail 75 is of a generally inverted U-shape, having a substantially horizontal portion 76 and downwardly extending outer, flanges 77 and 78 formed integrally therewith. The carriage rail 75 may be formed having other shapes so long as in keeping with the teaching of the present invention. While the carriage rail 75 may be made of any suitably rigid material, preferred materials have been found to be either steel or aluminum.

It is to be understood that the carriage rail 75 reciprocates upon the frictionless blocks 72 and 74 as supported by the mounting bracket 70 and the supporting legs 62, 64, 66 and 68. A carriage reciprocating drive assembly 80 is provided to impart such reciprocating movement to the carriage rail 75.

The carriage rail drive assembly 80 preferably comprises a two-way pneumatic piston and cylinder arrangement. As shown schematically in FIG. 2, the drive assembly 80 provides an air cylinder 82 secured at one end to a bracket 83 that depends from the mounting bracket 70. The air cylinder 82 is maintained in constant communication with a remote air source that provides the air necessary for operation of the pneumatics of the drive assembly. This same air source is also used to supply the bellows of the sensing accumulating pads 100a-100d as described hereinbelow. A piston rod 84 extends from the other end of the cylinder 82. The piston rod 84 is connected to a drive bracket 85, which is, in turn, fixedly secured to the side of the carriage rail 75. Thus, conventional operation of the pneumatic cylinder 82 and piston 84 arrangement causes a reciprocating movement of the carriage rail 75. Furthermore, the stroke length of the reciprocating carriage rail 75 is defined by the stroke length of the piston rod 84. In the drawings, the articles 12, 14, 16 and 17 are moved from left to right from the loading station 20 to the discharge station 25. Thus, when the piston 84 is being withdrawn into the cylinder 82, the carriage 75 is on a forward stroke, thereby advancing the articles 12, 14, 16 and 17 toward the discharge station 25. When the piston 84 is withdrawing from the cylinder 82, the carriage 75 is on a rearward stroke.

Figure 2:
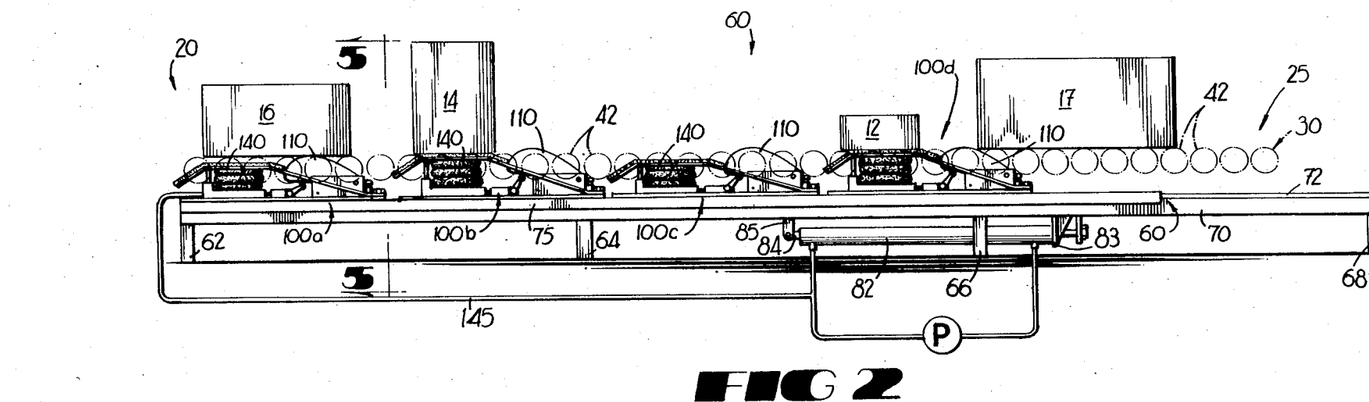
FIG. 2 is a side elevational schematic view of the embodiment of the transfer conveyor shown in FIG. 1, showing, in particular, the carriage rail and drive mechanism.
Figure 3:
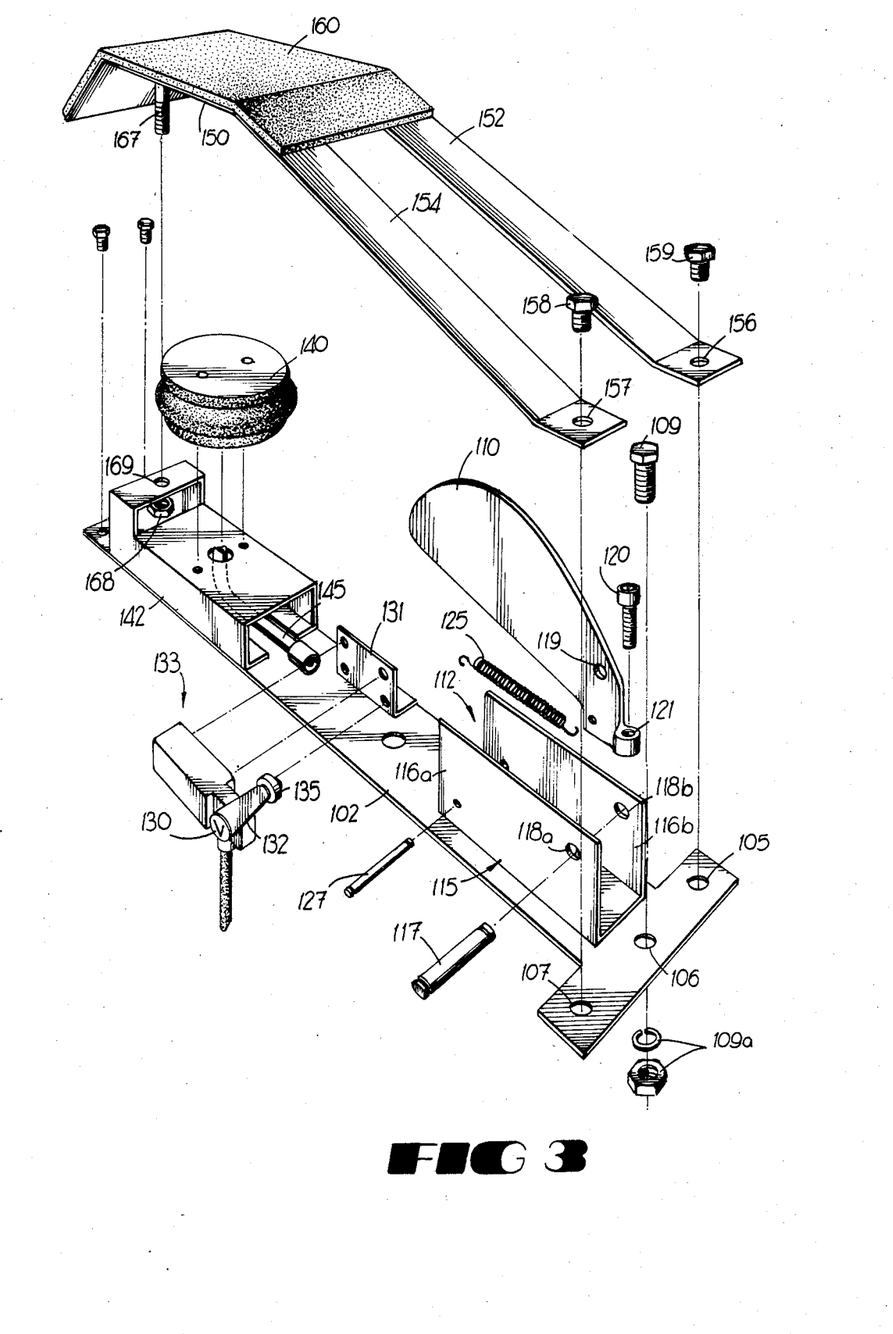
FIG. 3 is an exploded pictorial view of the sensing accumulating pad of the embodiment shown in FIG. 1.

The transfer conveyor 10 further provides a plurality of sensing accumulating pad assemblies 100. A single sensing accumulating pad 100a is shown in FIG. 3. FIG. 2 shows four sensing accumulating pads 100a, 100b, 100c, and 100d. Since each is identical in construction, only one will be described in detail hereinbelow.

The sensing accumulating pad 100a provides a base 102 which is configured as a flat, T-shaped member with three apertures 105, 106 and 107 at its forwardmost end (FIG. 3). The base is secured to the reciprocating carriage rail 75 by a bolt 109 that extends freely through the aperture 106, and a corresponding opening defined in the carriage rail, to be received by a nut 109a. As shown in FIG. 5, the nut 109a rests between the lower surface of the mounting bracket 70. In this manner, the sensing accumulating pad 100a is mounted upon the carriage rail 75 for reciprocal movement therewith. Of course, other means of securing the sensing accumulating pad 100a may be provided, so long as the means of securing the pad does not interfere with the reciprocal movement of the carriage rail 75 or the sensing accumulating pad.

The sensing accumulating pad 100a further provides a sensing cam 110. The sensing cam 110 is located at the forward end of the pad 100a and, as shown best in FIGS. 1 and 2, is shaped so as to project upwardly of the plane of the frame rollers 42 when the cam has sensed the absence of an article 12, 14, 16 or 17. The sensing cam 110 is pivotally mounted within a channel 112 formed by a mounting member 115. The channel 112 is defined by two vertical walls 116a and 116b of the mounting member 115. The sensing cam 110 is secured to said mounting member 115 by a pivot pin 117, which extends through the two apertures 118a and 118b in the respective vertical walls 116a and 116b of the sensing cam mount 115 and an aperture 119 provided near the forward end of the sensing cam 110. The sensing cam 110 is also mounted directly to the pad base 102 by a vertical bolt 120 that extends freely through an aperture 121 defined in the forwardmost position of the cam. It is to be noted that the bolt 120 is not tightened so completely as to retain the cam 110 from any movement. Instead, the bolt 120 is secured so that the forwardmost portion of the sensing cam 110 may float.

A tension spring 125 is provided to act upon the sensing cam 110. One end of the tension spring 125 is secured within an aperture 126 provided at the forwardmost lower portion of the sensing cam 110. The other end of the tension spring 125 is secured to a rod 127 that extends between the vertical walls 116a and 116b of the mounting member 115. Thus, the spring 125 rests entirely within the confines of the lower portion of the channel 112 defined by the mounting member 115. The spring 125 causes the sensing cam 110 to pivot about pin 117, thereby causing the forward portion of the sensing cam to pivot downwardly upon the bolt 120 and the rearward portion of the cam to pivot upwardly (as indicated by the arrow 128 in FIG. 4). Thus, the sensing cam 110 is urged upwardly by the action of the tension spring 125.

The sensing accumulating pad 100a further provides an air valve 130. The air valve 130 is mounted to the base 102 by an angle bracket 131 and conventional fasteners (not shown). The air valve 130 includes an actuating arm 132 which is pivotally received by a conventional regulator assembly, indicated generally at 133. As shown best in FIG. 4, the outer end of the actuating arm 132 is fitted with a small cylindrical member 135 that engages the lowermost surface of the sensing cam 110 at a position rearward of the mounting member 115. The actuating arm 132 is urged upwardly by conventional means (not shown). When the actuating arm 132 is in a released uppermost position, the regulator 133 is in an open position. When the actuating arm 132 is depressed to its lowermost position, the regulator 133 is in a closed position. As described in greater detail below, this operation of the air regulator 133 is controlled by the actuating arm 132 in response to the action of the sensing cam 110.

Figure 4:
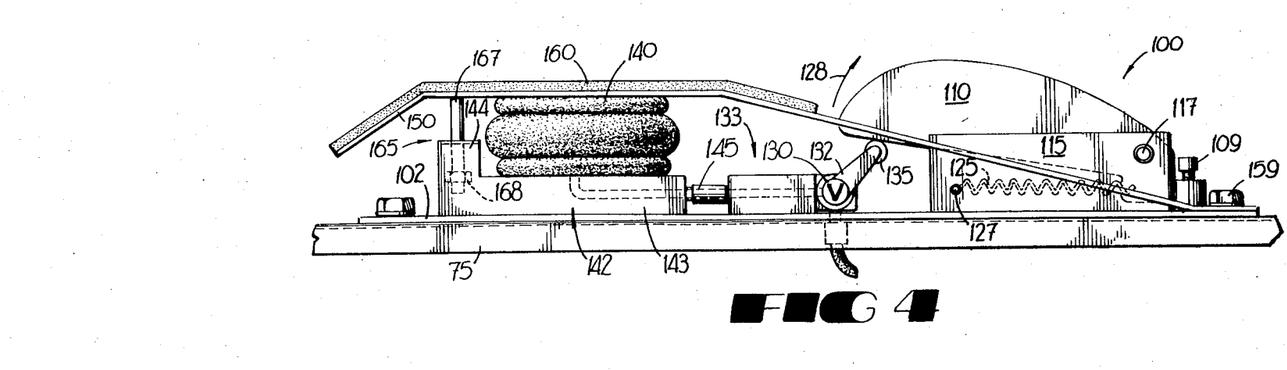
FIG. 4 is a side elevational view of the sensing accumulating pad shown in FIG. 3.

The sensing accumulating pad 100a further includes an air bag or bellows 140 at its rear portion. The air bag 140 is secured to the base 102 by a bellows mounting member 142. As shown in FIG. 4, the bellows mounting member 142 is L-shaped in configuration, having an elongated forward horizontal portion 143 and a rearward portion 144 projecting upward of the forward portion. The air bag 140 may be secured to the mounting member 142 in any conventional manner so long as the bag 140 remains in constant communication with an air supply line 145. The air supply line 145, in addition to the air cylinder 82 and piston 84, travels with the reciprocating carriage rail 75 and is conventionally attached to and communicates with an air supply source. The air passing through the air supply line 145 is regulated by means of the air regulator 130 in a conventional manner. Those skilled in the art will recognize that such an arrangement is known in the art and hence, it is not further disclosed herein.

The bellows 140 provides a chamber that, when inflated, rises to engage and move an article-engaging plate 150. Those skilled in the art will recognize that other means for moving the article-engaging plate 150, such as a spring or the like, may be provided.

The article-engaging plate 150 is a unitary member formed having two forward extending arms 152 and 154 that project downwardly therefrom to engage the base 102 of the pad 100a. The arms 152 and 154 are formed having two apertures 156 and 157, respectively, at their forwardmost extensions. The article engaging plate 150 is secured by two bolts 158 and 159 that extend freely through the two apertures 156 and 157, and apertures 105 and 107 provided in the base 102. Thus, the article engaging plate 150 travels horizontally with the reciprocating carriage rail 75 at a position rearwardly of the sensing cam 110. As shown in FIGS. 3 and 4, the article engaging plate 150 may be fitted with a friction pad 160 so as to insure contact with the article. The friction pad 160 may be made of rubber or any other suitable material that serves to insure contact of the friction pad with an article to be transferred.

The vertical travel of the article engaging plate 160 is limited by a limiting assembly 165. The limiting assembly 165 consists of a downwardly extending rod 167 and a stop member 168. As shown best in FIG. 4, the rod 167 extends through an aperture 169 (FIG. 3) provided in the top rear surface of the rear portion 144 of the bellows mounting member 142. The stop member 168, which is illustrated as a nut threaded upon the rod 167, is secured below the surface of the bellows mounting member 144. It is to be noted that the stop member 168 rests within a cavity defined by the rearward portion 144 of the bellows mounting member 142 and the base plate 102 of the sensing accumulating pad 100a. As a result of this arrangement, the article engaging plate 150 can rise no higher than the gap provided between the stop member 168 and the top rear surface of the bellows 140 mounting surface. As described in greater detail below, this arrangement must permit sufficient vertical travel of the engaging plate 150 to permit contact thereof with an article on the rollers 42.

Operation of this first embodiment of the present invention is shown in FIG. 2. The carriage rail 75 is moved outwardly by the piston rod 84 and drive bracket 85. (FIG. 2 demonstrates the operation of the device on the advancing or return stroke wherein the carriage rail 75 is moved from left to right.) On the rearward stroke of the carriage rail 75, all the bellows 140 are deflated such that no article movement takes place. The bellows 140 are deflated by denying any air flow to the bellows from the remote air source (FIG. 2). As a result, the article engaging plates 150 fall by gravity to their lowest positions. Because this position is below the level of the rollers 42 (and therefore the articles 12, 14, 16 and 17), the article-engaging plates 150 pass unimpeded below the articles. As the carriage rail 75 carries the sensing accumulating pads 100a–100d rearwardly, the sensing cams 110 of each will contact and be depressed by the articles 12, 14, 16 and 17. However, because air is being denied to each of the bellows, the action of the sensing cams 110 causes no responsive movement of the article engaging plates 150 whatsoever on the rearward stroke of the carriage rail 75.

Once the piston rod 84 has been fully extended, the rod and bracket begin the forward or the article advancing stroke. This action provides the reciprocal movement of the carriage rail 75. Once the article advancing stroke has begun, the air flow from the remote source (FIG. 2) is reinstated so that, in response to the action of the sensing cams 110, each of the bellows 140 may be inflated to raise the article-engaging plates 150 accordingly. As a result of this reciprocating movement of the carriage rail 75, sensing accumulating pad 100a is moved to a position underneath the article 16. As the sensing cam 110 is moved under the article 12 on the article advancing stroke, the cam is pressed downwardly and, in turn, the actuating arm 132 is moved downwardly by means of the cylindrical member 135 engagement with the bottom of the sensing cam. When the actuating arm is in the down position, the regulator 130 blocks the flow of air to the bellows 140 and connects the bellows to atmosphere, thereby deflating the bellows. This, in turn, causes the article engaging plate 150 to be lowered and pass unimpeded beneath the article 16. Thus, as the sensing accumulating pad 100a passes under the article 16, the article engaging plate 150 does not contact the article and the article 16 remains stationary.

However, once the sensing cam 110 clears the article 16, the sensing cam 110 will pivot upwardly as a result of the tension spring 125 acting thereon. In this manner, the sensing cam 110 is said to sense the leading edge of the article 16. When the sensing cam 110 reaches the up position, the actuating arm 132 will correspondingly reach its up position. When the actuating arm 132 is in the up position, air is delivered from the air source through the air line 145 to the bellows 140, and the bellows inflate. This causes the article engaging plate 150 to rise and engage the bottom front portion of the article 16. As a result of the friction pad 160, the article 16 is grabbed and pulled along the rollers 42 by its leading portion. This pulling action is best illustrated by sensing accumulating pad 100b in FIG. 2.

It is a principal feature of the present invention that no two articles are allowed to contact one another. To demonstrate this feature of the invention, reference is made to sensing accumulating pad 100d. Sensing accumulating pad 100d has been pulling article 12 along the roller frame 42. However, the sensing cam 110 has just detected the trailing edge of preceding article 17. Because of the reciprocating movement of the carriage rail 75, the sensing accumulating pad will continue forward in an activated state 100d. As the pad 100d travels forward, the cam 110 is depressed by the article 17, the article engaging plate 150 and friction pad 160 are disengaged from succeeding article 12. Thus, article 12 will come to rest without contacting article 17.

Figure 6:
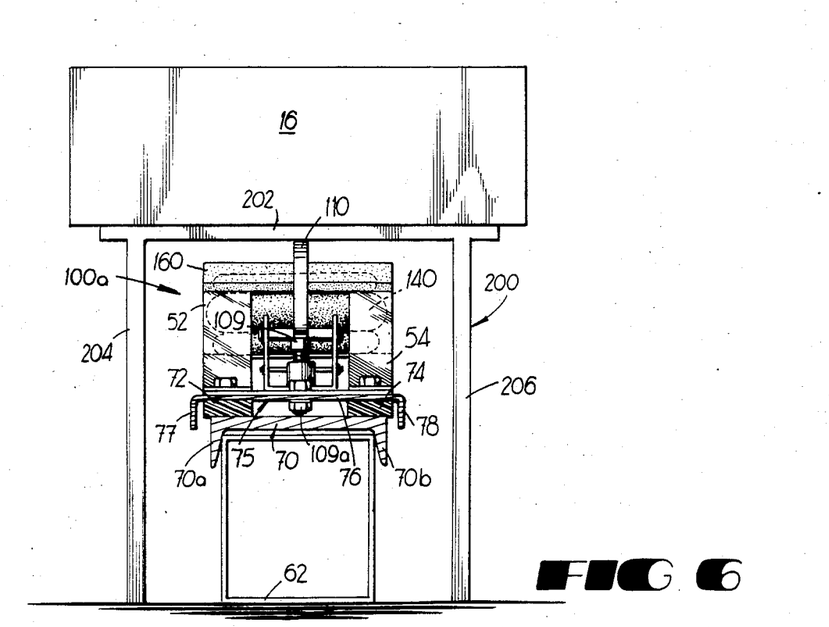
FIG. 6 is a schematic cross-section view of a conveyor according to a second preferred embodiment of the present invention.
Figure 7:
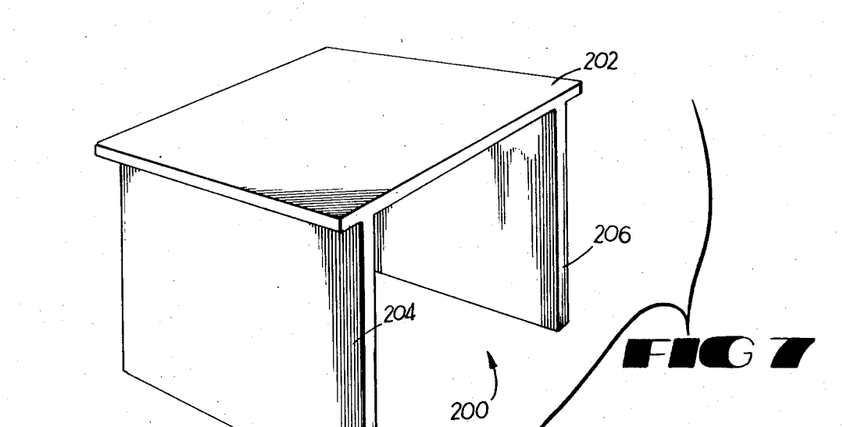
FIG. 7 is a perspective view of an article support member according to the second preferred embodiment of the present invention.
Figure 8:
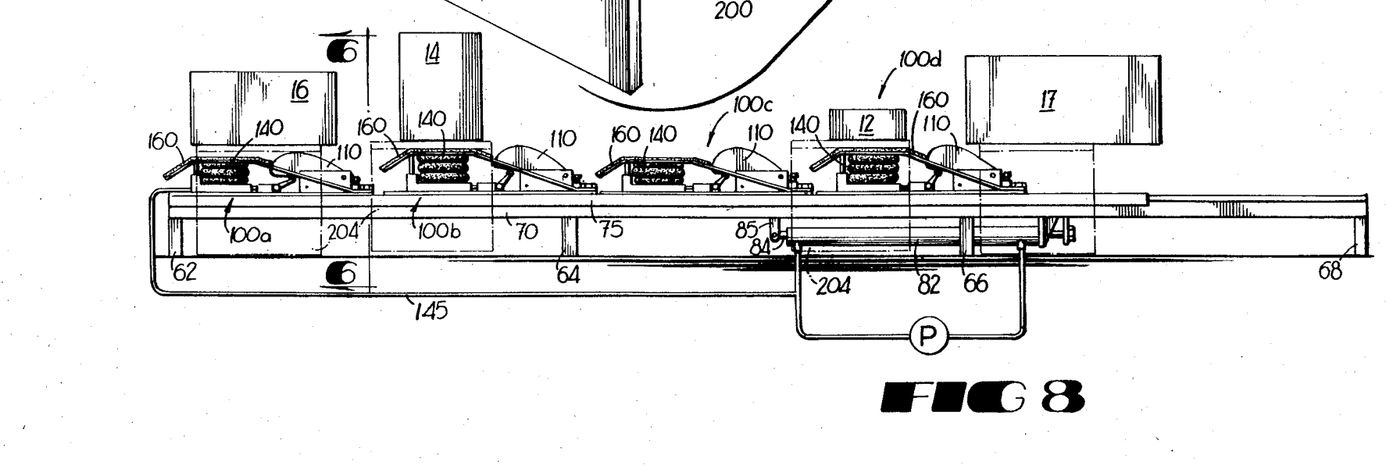
FIG. 8 is a side elevational schematic view of the second preferred embodiment of the present invention.

A second preferred embodiment of the present invention is disclosed by reference to the detailed description of the first preferred embodiment and to drawing FIGS. 6, 7 and 8. FIG. 6 shows the sensing accumulating pad 100a adapted for use with this second preferred embodiment of the invention. In a manner similar to that of FIG. 5, FIG. 6 shows a single sensing accumulating pad 100a as a schematic cross-section of a full-length conveyor 10 including sensing accumulating pads 100a–100d as mounted upon the reciprocating carriage drive assembly 60. Since the sensing accumulating pads 100a–100d are identical in construction, only one sensing accumulating pad 100a will be described in detail.

As in the first embodiment, the sensing accumulating pad 100a is mounted for reciprocal movement upon the carriage rail 75. The carriage rail 75 is slidably mounted upon two substantially frictionless blocks 72 and 74 that extend the length of the carriage rail. The blocks 72 and 74 are fixedly secured to the mounting bracket 70, which, in turn, is supported by the rectangular leg member 62, 64, 66 and 68. The supporting leg 62, as well as the like supporting legs 64, 66 and 68, rest upon the floor. Thus, in a manner identical to that described hereinabove, the sensing accumulating pad 100a is disposed for reciprocal movement upon the carriage rail 75.

The operation of the sensing accumulating pad 100 is also identical to that described in the first preferred embodiment. However, instead of being used in connection with a stationary roller frame 30, the sensing accumulating pad 100a is disposed for reciprocal movement underneath an independent, mobile article support member 200. The illustrated article support member 200 (FIG. 7) consists of a table portion 202 and two legs 204 and 206, each of which rests upon a floor surface and extends the length of the table portion 202. The legs 204 and 206 are of sufficient height to permit the carriage rail assembly 60 and the sensing accumulating pad 100a to fit completely under the table 202. As such, the height of the lower surface of the table 202 is substantially equal to the plane of the rollers 42 of the frame 30 in the first embodiment. Those skilled in the art will appreciate that differently configured article support members 200 may be provided.

Operation of this second preferred embodiment is shown in FIG. 8. The article 12 to be transferred is loaded onto a first article support member 200. Once the article 12 is loaded, the sensing accumulating pads 100a–100d act upon the first support member 200 in a manner similar to that as the sensing accumulating pads 100a–100d acted upon the articles 12, 14, 16 and 17 in the first embodiment. On the rearward stroke of the carriage rail 75, the bellows 140 are deflated so that the article-engaging plates 150 pass under the table 202 of the article support member 200 and no movement thereof occurs. Once the carriage 75 begins its article advancing stroke, the bellows 140 are inflated. As a result of the reciprocating movement of the carriage rail 75, the sensing accumulating pad 100a may be moved behind the position of the article support member 200. As the sensing accumulating pad 100a moves forward, the sensing cam 110 will detect the trailing lower edge of the table 202 of the first article support member 200 carrying the article 12. As the sensing cam 110 is moved under the table 202, the cam is depressed and, in turn, the actuating arm 132 is depressed. This causes the regulator 130 to block the flow of air to the bellows 140 and connects the bellows to the atmosphere, thereby deflating it. This, in turn, causes the article-engaging plate 150 to be gravitationally lowered and pass beneath the table 202 of the article support member 200.

However, once the sensing cam 110 senses the leading forward lower edge of the table 202, the action of the tension spring 125 will urge the sensing cam 110 upward. As a result, the actuating arm 132 will rise and air will be delivered to the bellows 140. As a result, the bellows 140 will inflate and, in turn, cause the article-engaging plate 150 to rise and engage the bottom surface of the table 202 of the article support member 200. In this second embodiment of the present invention, the article-engaging plate 150 and friction pad 160 lift the entire first article support member 200 and the article 12 off of the ground surface and move them forward in tandem with the reciprocating carriage rail 75. It is contemplated that such an arrangement may require an enlarged plate 150 and an oversize or an additional bellows 140. The construction of such an enlarged plate 150 or modified bellows 140 is entirely within the teaching of the present invention.

In a manner similar to that of the first embodiment, the second embodiment of the present invention provides that no two article support members 200 contact one another. As shown in FIG. 8, the sensing cam 110 will sense the trailing edge of a preceding article support member 200 carrying the article 14. As the sensing cam 110 passes under the preceding article support member 200, the bellows 140 will be deflated and the article-engaging plate 150 gravitationally lowered. As a result, the succeeding article support member 200 carrying the article 12 will also be lowered and set to rest upon the ground surface. In this manner, the article support members 200 are prevented from engaging one to the other.

Figure 9:
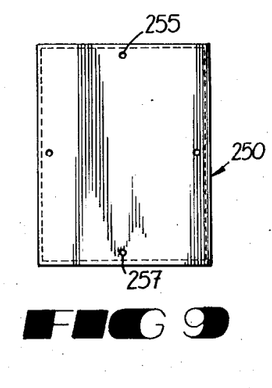
FIG. 9 is a top view of a pallet according to a third preferred embodiment of the present invention.
Figure 10:
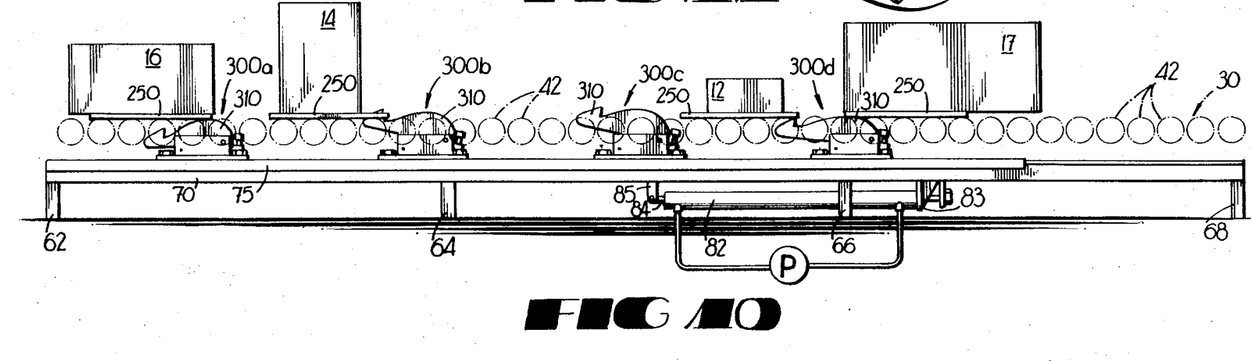
FIG. 10 is a side elevation schematic view of the third preferred embodiment of the present invention.
Figure 11:
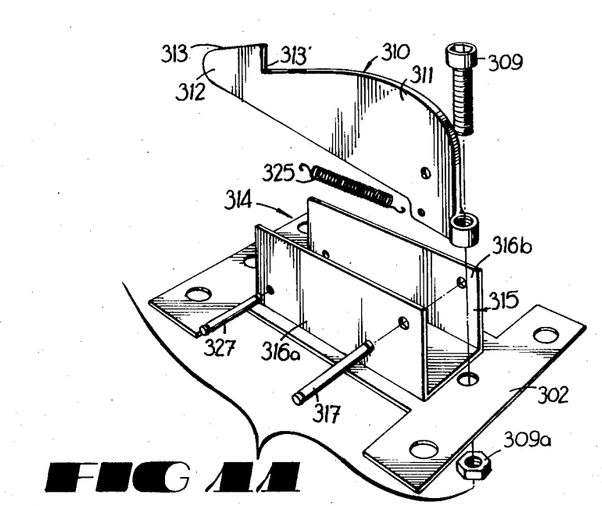
FIG. 11 is an exploded pictorial view of the embodiment shown in FIG. 10.

A third embodiment of the present invention is disclosed by reference to the detailed description of the first two embodiments and drawing FIGS. 9, 10 and 11. This third embodiment provides the stationary frame 30 illustrated in FIGS. 1 and 2. Furthermore, this third embodiment provides the reciprocating carriage rail assembly 60 illustrated in FIGS. 2 and 5. However, as described in greater detail below, this third embodiment does not utilize the air supply source to inflate the bellows 140 as described in the first two embodiments.

As on the first two embodiments, the carriage rail 75 is slidably mounted upon two frictionless blocks 72 and 74 that extend the length of the rail. The blocks 72 and 74 are secured to the mounting bracket 70, which is, in turn, supported by the rectangular legs 62, 64, 66 and 68.

A pallet 250 is provided to be transferred along with the article 12, 14, 16 or 17 on this third embodiment of the transfer conveyor 10. As illustrated in FIG. 8, the pallet 250 is a substantially planar member, having a bottom surface that is flat so as to move freely across the rollers 42 of the stationary frame 30. The top of the pallet 250 is also flat so as to carry an article 12, 14, 16 or 17 thereon. The pallet 250 is formed having two apertures 255 and 257 that extend the height of the pallet. The aperture 255 is positioned intermediate the sides of the pallet 250 near its leading edge. The aperture 257 is also positioned intermediate the sides of the pallet 250, but is located near the trailing edge of the pallet.

As shown in FIG. 10, this third embodiment of the present invention provides a plurality of sensing accumulating hooks 300a–300d mounted upon the carriage rail 75 for reciprocal movement therewith. FIG. 10 illustrates sensing accumulating hook 300a. Since each of the sensing accumulating hooks 300a–300d are identical in construction to one another, only one sensing accumulating hook 300a is described herein in detail.

The sensing accumulating hook 300a consists of a base plate 302 that is similar in construction to the base plate 102 of the first and second embodiments described above. The base plate 302 is formed having an aperture 306 near its forwardmost edge. A bolt 309 extends freely through the aperture 306 and then through an opening in the carriage rail 75 (not shown) to engage a nut 309a. In this manner, the base plate 302 is secured to the carriage rail 75 and, therefore, reciprocates therewith.

The sensing accumulating hook 300a further consists of a sensing/advancing member 310. The sensing/advancing member 310 consists of a sensing cam 311 and an article advancing hook 312 formed integrally therewith. The sensing cam 311 is forward of the hook 312 and configured to project upwardly of the plane of the rollers 42 of the stationary frame 30. The article advancing hook 312 is also configured to project upwardly of the plane of the rollers 42. It is to be noted that the trailing edge portion 313 of the hook is curved or indented, whereas the leading portion 313' of the hook 312 comprises a straight, substantially vertical surface. In addition, the article advancing hook 312 is dimensioned to be freely received by either of the apertures 255 and 257 in the pallet 250.

The sensing/advancing member 310 is pivotally mounted within a channel 314 formed by a mounting member 315. The mounting member 315 consists of two vertical walls 316a and 316b that are fixedly secured to the base plate 302 in a conventional manner. The sensing/advancing member 310 is mounted on a pivot pin 316 that extends between the vertical walls 316a and 316b of the mounting member, and also through an aperture (not shown) in the forward lower portion of the sensing cam 311. In a manner similar to that described in the first embodiment, the hook 312 of the sensing/advancing member 310 is urged upwardly in a clockwise direction by a tension spring 325. The tension spring 325 is connected at one end to the sensing cam 311 at a position somewhat lower than and forward of the pivot pin 317 so as to provide the clockwise pivot action of the sensing/advancing member 310. The spring 325 is connected at its other end to a set pin 327 that extends between the vertical walls 316a and 316b. The action of the tension spring 325 urges the hook 311 of the sensing/advancing member 310 in an upward direction. Thus, both the sensing cam 311 and the hook 312 project above the plane of the rollers 42.

Operation of this third embodiment of the present invention is shown in FIG. 10. The carriage rail 75 is moved rearwardly by the rearward stroke of the piston rod 84. On the corresponding rearward stroke of the rail 75, since the hooks 312 of the sensing accumulating hooks 300a–300d project above the plane of the rollers 42, they will contact the leading edges of any pallets 250 on the rollers. However, as a result of the pivotal mounting of the sensing/advancing member 310 and the curved back edge 313 of the hook 312, the hooks will contact and then pass under the pallets 250. Once a particular hook 312 passes the leading edge of any pallet 250, the action of the tension spring 325 will urge the hook against the lower surface of the pallet 250. As the sensing/advancing member 310 is moved further rearward, the effect of the tension spring 325 will cause the hook 312 to rise and enter into the aperture 255 located near the leading edge of the pallet 250. However, again because of the curved back edge 313 of the hook 312 and of the pivotal mounting of the sensing/advancing member 310, the hook will slide out of the aperture 255 as the rail 75 continues to carry the sensing/advancing member rearward. Thus, on the rearward stroke of the carriage rail 75, no sensing accumulating hook 300a–300d will act to disturb the position of a pallet 250.

Once the piston rod 84 has been fully extended, the carriage rail 75 will begin the return or article advancing stroke. As a result of this reciprocating movement of the carriage rail 75, the sensing accumulating hook 300a is moved to a position underneath the pallet 250 carrying the article 16. As the sensing cam 310 passes underneath the pallet 250, the cam is urged downwardly. This, in turn, pivots the article-advancing hook 312 in a counterclockwise direction, downwardly of the pallet 250. However, once the sensing cam 310 detects the leading edge of the pallet 250 (thereby indicating the absence of any impeding preceding pallet), the action of the tension spring 325 will cause the sensing cam 311 to rise, and further cause article-advancing hook 312 to rise and enter the aperture 255. Because forward surface 313' of the hook 312 is straight, the hook will catch the pallet 20 and pull it along the rollers 42. Of course, apertures could be provided on the side of a pallet 250 so as to effect a right angle movement of the pallet on a correspondingly aligned conveyor.

In keeping with the teaching of the present invention, this third embodiment provides that no two pallets 250 are allowed to contact one another. To demonstrate this feature of the invention, reference is made to sensing accumulating hook 300d in FIG. 10. Sensing accumulating hook 300d has been pulling a pallet 250 carrying the article 12 along the rollers 42 of the stationary frame 30. However, the sensing cam 310 has just detected the trailing edge of a preceding pallet 250 carrying the article 17. Because of the reciprocating movement of the carriage rail 75, the sensing accumulating hook will continue forward. Even so, the sensing cam 311 will be caused to rotate about the pivot pin 317 as the sensing/advancing member 310 is carried forward. This will cause the hook 312 to move downwardly out of the aperture 255. As a result, the pallet 250 carrying the article 12 will come to rest and prevented from contacting the pallet 250 carrying the article 17.

Thus, it is seen that an accumulating transfer conveyor having the features of the present invention constitutes an improvement over prior art conveyors. Because the present conveyor senses and engages the leading edge of an article or an article support member carrying an article, it is able to transfer articles of entirely different sizes. Furthermore, the second embodiment of the present invention is not dependent upon a stationary frame. Thus, in combination with the sensing accumulating pads, the second embodiment provide a rollerless conveyor that can be set up on any floor surface without need of a fixed loading or fixed discharge station. Finally, the present invention is straightforward in construction, thereby reducing the potential for breakdown of the conveyor and reducing any associated delays in production and increases in maintenance cost.

It should be understood that the foregoing relates only to three preferred embodiments of the present invention and that numerous modifications or alterations may be made therein without departing from the spirit and scope of the invention as set forth in the appended claims.

I claim:
1. An accumulating transfer conveyor, comprising:
   a conveyor frame for supporting a plurality of articles to be transferred thereon;
   a carriage rail disposed for movement lengthwise of said conveyor frame;
   means for reciprocating said carriage rail lengthwise of said conveyor frame;
   a plurality of sensing accumulating pads mounted upon said carriage rail for reciprocal movement therewith so as to engage said articles to be transferred along said conveyor frame, each of said sensing accumulating pads including,
   a base plate,
   a sensing cam pivotally mounted upon the forwardmost portion of said base plate,
   means for urging said sensing cam upward such that the uppermost portion of said sensing cam rests at a position extending above said conveyor frame until said sensing cam comes into contact with one of said articles to be transferred thereon,
   means for advancing one of said articles along said frame, said article-advancing means being mounted upon said base plate rearwardly of said sensing cam and comprising an article-engaging plate in substantially parallel alignment with said conveyor frame, and
   means responsive to said sensing cam for raising and lowering said article-advancing means,
   whereby upon the detection of a leading edge of a first article by said sensing cam on the forward stroke of the carriage rail, said sensing cam pivots upwardly as it passes beyond said leading edge and causes said article-advancing means to engage the forward portion of said article and advance said first article forward along said frame, and upon the detection of a trailing edge of a second article preceeding said first article by said sensing cam, said sensing cam pivots downwardly and causes said article-advancing means to disengage from said leading portion of said first article.
2. The accumulating transfer conveyor of claim 1 wherein said means for reciprocating said carriage rail comprises a pneumatic piston and rod assembly that travels with said carriage rail.
3. The accumulating transfer conveyor of claim 1 wherein said means for raising and lowering said article-advancing means comprises a bellows disposed below said article-engaging means and, responsive to said pivot action of said sensing cam, inflates or deflates.
4. The accumulating transfer conveyor of claim 3 wherein said bellows are deflated on the rearward stroke of said carriage rail so as to insure that no movement of said first or second articles occurs on said rearward stroke.
5. The accumulating transfer conveyor of claim 3 wherein said means for raising and lowering said article-advancing means is made responsive to said sensing cam by an air regulator in communication with a remote air source and said bellows, said air regulator including an actuating arm responsive to the movement of said sensing cam such that when said sensing cam rises, said regulator permits air to flow to said bellows, and when said sensing cam falls, said regulator blocks any air flow to said bellows.
6. The accumulating transfer conveyor of claim 1 wherein said means for urging said sensing cam upward comprise a tension spring.

7. An accumulating transfer conveyor, comprising:
a plurality of stand alone, mobile article support members for supporting at least one article thereon;
a plurality of carriage rails, at least one of said carriage rails being disposed for movement substantially lengthwise of at least one of said article support members, each of said plurality of carriage rails including means for reciprocating each said carriage rail; and
a plurality of sensing accumulating pads mounted upon said carriage rail for reciprocal movement therewith so as to engage said articles to be transferred along said conveyor frame, each of said sensing accumulating pads including,
a base plate,
a sensing cam pivotally mounted upon the forwardmost portion of said base plate,
means for urging said sensing cam upward such that said sensing cam rests at a position extending above said conveyor frame until said sensing cam comes into contact with one of said articles to be transferred thereon,
means for advancing one of said articles along said frame, said article-advancing means being mounted upon said base plate rearwardly of said sensing cam and comprising an article-engaging plate in substantially parallel alignment with said frame, and
means responsive to said sensing cam for raising and lowering said article-advancing means,
whereby upon the detection of a leading edge of a first article by said sensing cam on the forward stroke of the carriage rail, said sensing cam pivots upwardly as it passes beyond said leading edge and causes said article-advancing means to engage the forward portion of said article and advance said first article forward along said frame, and upon the detection of a trailing edge of a second article preceding said first article by said sensing cam, said sensing cam pivots downwardly and causes said article-advancing means to disengage from said leading portion of said first article.

8. The accumulating transfer conveyor of claim 7 wherein said means for reciprocating said carriage rail comprises a pneumatic piston and rod assembly that travels with said carriage rail.

9. The accumulating transfer conveyor of claim 7 wherein said means for raising and lowering said article-advancing means comprises a bellows disposed below said article-engaging means and, responsive to said pivot action of said sensing cam, inflates or deflates.

10. The accumulating transfer conveyor of claim 9 wherein said bellows are deflated on the rearward stroke of said carriage rail so as to insure that no movement of said first or second articles occurs on said rearward stroke.

11. The accumulating transfer conveyor of claim 9 wherein said means for raising and lowering said article-advancing means is made responsive to said sensing cam by an air regulator in communication with a remote air source and said bellows, said air regulator including an actuating arm responsive to the movement of said sensing cam such that when said sensing cam rises, said regulator permits air to flow to said bellows, and when said sensing cam falls, said regulator blocks any air flow to said bellows.

12. The accumulating transfer conveyor of claim 7 wherein said means for urging the rearward portion of said sensing cam upward comprises a tension spring.

13. An accumulating transfer conveyor comprising:
a frame for supporting a plurality of pallets to be transferred thereon, each of said pallets defining a leading portion thereof including means for capturing a hook member;
a carriage rail disposed for movement lengthwise of said frame;
means for reciprocating said carriage lengthwise of said frame; and
a plurality of sensing accumulating hooks mounted upon said carriage rail for reciprocal movement therewith so as to engage said article support members on said frame, each of said sensing accumulating hooks including
a pivotally mounted sensing cam,
a hook member integrally formed with and rearwardly positioned of said sensing cam, both said hook member and said sensing cam being configured to contact said pallets on said frame, and
means for urging said hook into contact with one of said pallets in response to said sensing cam,
whereby upon the detection of a leading edge of a first pallet by said sensing cam on the forward stroke of the carriage rail, said sensing cam upwardly and said hook member pivot upwardly and is captured by said capturing means in said forward portion of said first pallet and pull said first pallet forward along said frame, and upon the detection of a trailing edge of a second pallet preceding said 14. The accumulating transfer conveyor of claim 13 wherein said means for reciprocating said carriage rail comprises a pneumatic piston and rod assembly that travels with said carriage rail.

15. The accumulating transfer conveyor of claim 13 wherein said means for urging said hook in contact with one of said pallets comprises a tension spring.

16. The accumulating transfer conveyor of claim 15 wherein said capturing means comprises an aperture.

* * * * *